United States Patent [19]

Tulley et al.

[11] Patent Number: 5,795,186

[45] Date of Patent: Aug. 18, 1998

[54] MULTIMEDIA BEZELS

[75] Inventors: Brian Tulley, Ansonia; Denny Lo, Danbury, both of Conn.

[73] Assignee: The Siemon Company, Watertown, Conn.

[21] Appl. No.: 715,543

[22] Filed: Sep. 18, 1996

[51] Int. Cl.[6] .................................................. H01R 13/74
[52] U.S. Cl. ................................................. 439/557; 439/491
[58] Field of Search ..................................... 439/544, 557, 439/552, 559, 188, 562, 565, 491

[56] References Cited

U.S. PATENT DOCUMENTS

| | | | |
|---|---|---|---|
| 5,030,123 | 7/1991 | Silver | 439/188 |
| 5,302,140 | 4/1994 | Arnett | 439/544 |

Primary Examiner—Khiem Nguyen
Assistant Examiner—Eugene G. Byrd
Attorney, Agent, or Firm—Fishman, Dionne, Cantor & Colburn

[57] ABSTRACT

Multimedia bezels designed to receive a variety of connectors and fit within a standard panel cut-out. The bezels include top and bottom notches that engage the edge of the panel cut-out. An opening in the body of the bezel receives the connector. A resilient section allows one of the sets of notches to deflect towards the body for insertion in the panel cut-out. Once within the panel cut-out, the resilient section presses against the edge of the panel cut-out to firmly mount the bezel in the panel. The body of the bezel may be parallel (flat) or at an oblique angle (angled) to the panel. Both the flat and angled embodiments include icon holding grooves for receiving an icon for coding the port. In the flat embodiment, the icon also prevents deflection of the resilient section and acts as a lock. The bezels are side stackable so that a variety of simplex and duplex bezels can be utilized in a panel cut-out.

13 Claims, 6 Drawing Sheets

MULTIMEDIA BEZELS

BACKGROUND OF THE INVENTION

1. Field of the Invention

The invention relates to bezels for mounting a connector in a panel and in particular to multimedia bezels that provide for mounting of a variety of connectors in a standard panel cut-out.

2. Prior Art

In cable routing applications, access to a cable is often made at a panel that includes a connector mounted in the panel. The connector in the panel mates with a connector on the cable and allows cable to be coupled to the panel. The panel includes a cut-out that is sized to receive the connector. Currently, there are a wide variety of connector standards including ST, SC, RCA, BNC, etc. The cut-out in the panel must have a specific size and shape to provide for mounting the connector in the panel. Accordingly, a manufacturer must produce a variety of different panels having varying cut-outs in order to mount the various types of connectors. To complicate matters, the connectors may be mounted in the panel in simplex or duplex configurations.

The need for panels having cut-outs that match specific connector types has several drawbacks. Producing a variety of panels having differing panel cut-outs increases manufacturing costs and also requires maintaining a large inventory of differing parts. In addition, when changing from one connection standard (e.g. SC) to a second connection standard (e.g. ST) in the field, the installer must remove the entire panel and install a new panel having the appropriate cut-out for the new connection standard.

SUMMARY OF THE INVENTION

The above-discussed and other drawbacks and deficiencies of the prior art are overcome or alleviated by the multimedia bezels of the present invention. The multimedia bezels of the present invention are designed to receive a variety of connectors and fit within a standard panel cut-out. The bezels include top and bottom notches that engage the edge of the panel cut-out. An opening in the body of the bezel receives the connector. A resilient section allows one of the sets of notches to deflect towards the body for insertion in the panel cut-out. Once within the panel cut-out, the resilient section presses against the edge of the panel cut-out to firmly mount the bezel in the panel. The body of the bezel may be parallel (flat) or at an oblique angle (angled) to the panel. Both the flat and angled embodiments include icon holding grooves for receiving an icon for coding the port. In the flat embodiment, the icon also prevents deflection of the resilient section and acts as a lock. The bezels are side-stackable so that a variety of simplex and duplex bezels can be utilized in a panel cut-out.

By using a bezel that fits a standard panel cut-out, manufacturing of the panels is greatly simplified. In addition, installing and modifying connections in the field is simplified. The bezels of the present invention may be installed in the panel from either the front or back of the panel without tools.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
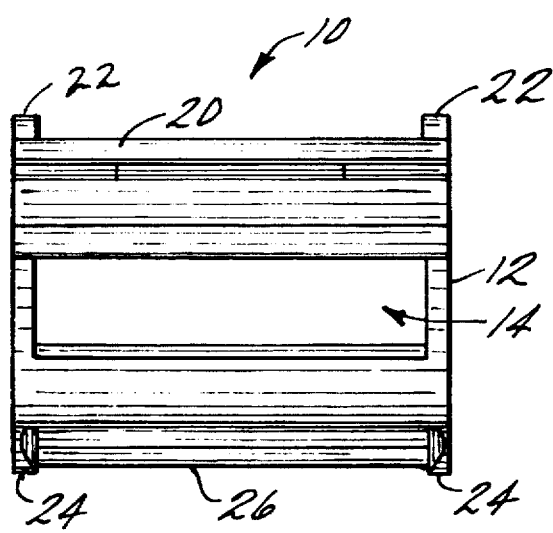
FIG. 1 is a front view of an angled bezel in a first embodiment of the invention.

FIG. 1 is a front view of an angled bezel, shown generally at 10, in a first embodiment of the invention. The angled bezel 10 has a body section 12 having an opening 14 formed therein for receiving a connector. The opening 14 shown in FIG. 1 is sized to receive a duplex SC fiber optic connector. In the ST and SC standards, the item that is mounted in the panel is commonly referred to as an "adapter." In other non-ST and non-SC standards, such as coaxial cable, BNC, etc., the item mounted in the panel is commonly referred to as a "connector." As used herein, the term "connector" should be construed to encompass both SC and ST adapters mounted in the panel and non-ST and non-SC connectors mounted in the panel. The angled bezel 10 includes a pair of top notches 16 and a pair of bottom notches 18. The top notches 16 and bottom notches 18 engage the edges of a panel cut-out in order to mount the angled bezel 10 in the panel. Exterior surfaces 20, 22, 24 and 26 adjacent to the opening of each notch 16 or 18 are curved to ease installation and removal of the angled bezel 10 in a panel cut-out. A resilient section 28 is provided between the bottom notches 18 and the body 12. The angled bezel is preferably made from a resilient material (e.g. plastic) so that the resilient section 28 can be flexed and then return to its original position.

To insert the angled bezel 10 in a panel cut-out, the top notches 16 are placed in the panel cut-out so that the panel extends into the top notches 16. The interference fit between the notches 16 and the panel edge prevents the bezel 10 from moving out of the panel cut-out. The bottom notches 18 are then pushed towards the panel. The angled bezel 10 may be inserted in the panel from either side of the panel. Therefore, either the curved surface 24 or the curved surface 26 contacts the edge of the panel cut-out. The interference between the curved surface 24 or 26 and the edge of the panel cut-out causes the resilient section 28 to flex and the notches 18 move towards the body 12. Once the curved surface 24 or 26 that initially contacted the edge of the panel cut-out clears the panel, the resilient section 28 forces the notches 18 away from the body 12 and snaps notches 18 around the edge of the panel cut-out. To remove the angled bezel 10 from the panel cut-out, the bottom notches 18 are pressed towards the body 12 while the angled bezel 10 is pulled from the panel cut-out. This disengages the panel edge from notches 18 and allows the angled bezel 10 to be removed.

Figure 3:
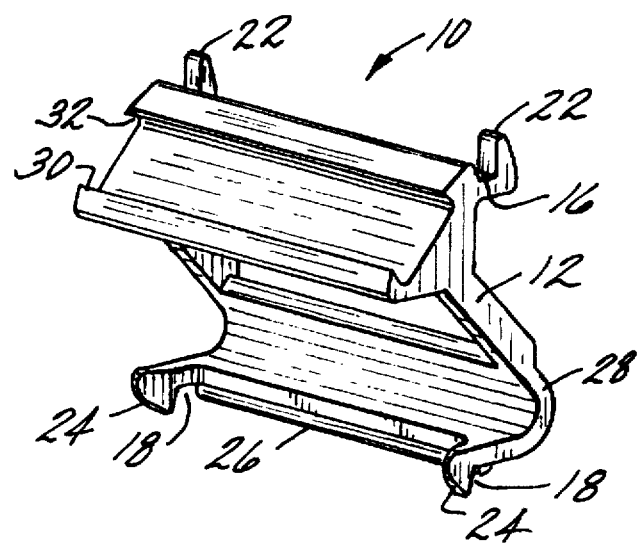
FIG. 3 is a perspective view of the angled bezel in a first embodiment of the invention.

The angled bezel 10 includes a pair of icon holding grooves 30 and 32 for receiving an icon for color coding or otherwise identifying the port. The opening 14 in body 12 receives a duplex connector and thus the length of the icon grooves 30 and 32 is sufficient to hold two icons, one for each port. The notches 16 and 18 define a plane that corresponds to the plane of the panel cut-out. The body 12 is at an oblique angle relative to the plane defined by the notches 16 and 18. This provides a gravity feed configuration in which a connector mounted in the angled bezel 10 is pointing towards the floor. FIG. 3 is a perspective view of the angled bezel 10 clearly showing the icon holding grooves 30 and 32.

Figure 2:
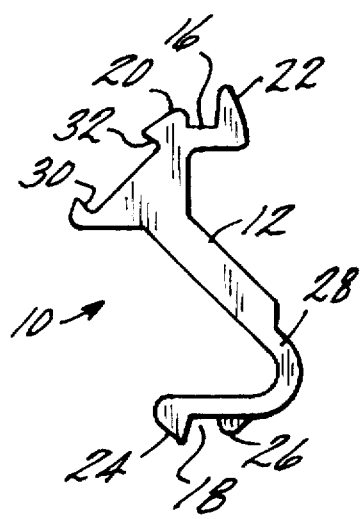
FIG. 2 is a side view of the angled bezel in a first embodiment of the invention.
Figure 4:
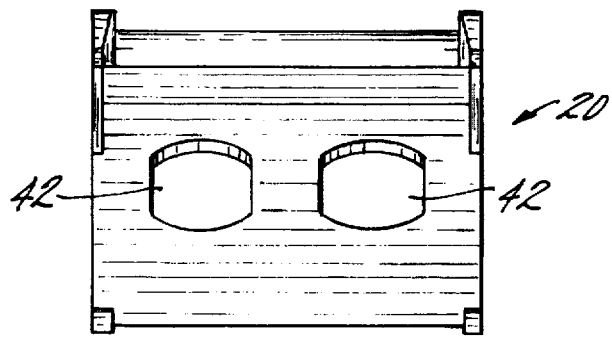
FIG. 4 is a front view of an angled bezel in a second embodiment of the invention.
Figure 5:
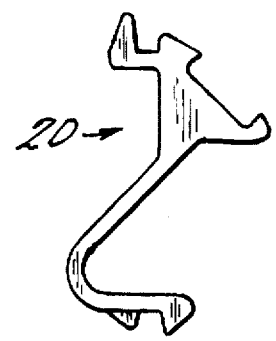
FIG. 5 is a side view of the angled bezel in a second embodiment of the invention.
Figure 6:
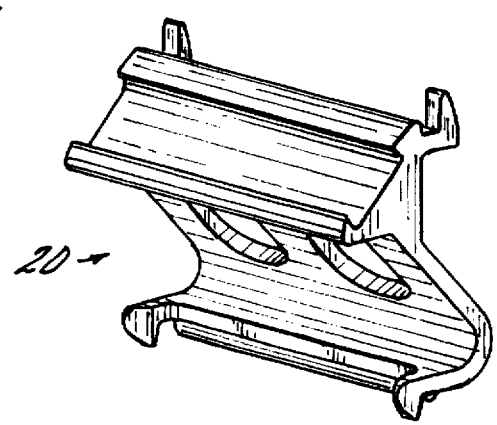
FIG. 6 is a perspective view of the angled bezel in a second embodiment of the invention.

FIGS. 4–6 are respective front, side and perspective views of an alternative angled bezel 40. The angled bezel 40 is similar to angled bezel 10 shown in FIGS. 1–3. The single opening 14 is replaced with two openings 42 in body 12. The openings 42 each receive an ST fiber optic connector to form a duplex ST port.

Figure 7:
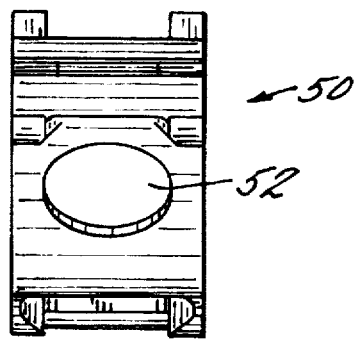
FIG. 7 is a front view of an angled bezel in a third embodiment of the invention.
Figure 8:
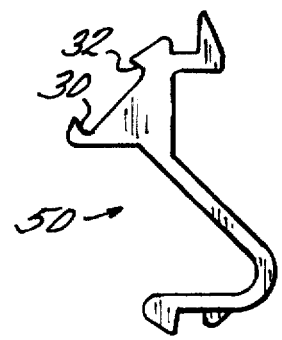
FIG. 8 is a side view of the angled bezel in a third embodiment of the invention.
Figure 9:
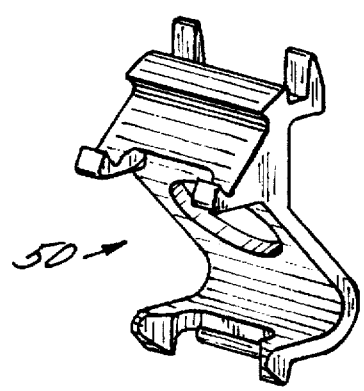
FIG. 9 is a perspective view of the angled bezel in a third embodiment of the invention.

FIGS. 7–9 are respective front, side and perspective views of an alternative angled bezel 50. The angled bezel 50 has a similar construction as angled bezels 10 and 40. The angled bezel 50 is designed to receive a single connector and thus is approximately half the width of the bezels 10 and 40. The icon holding grooves 30 and 32 receive a single icon. The opening 52 in angled bezel 50 receives a single F-type coaxial connector to form a simplex F-type port.

Figure 10:
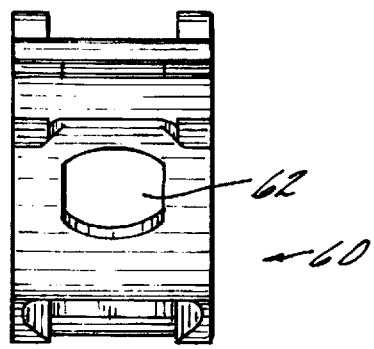
FIG. 10 is a front view of an angled bezel in a fourth embodiment of the invention.
Figure 11:
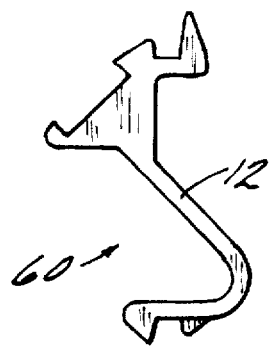
FIG. 11 is a side view of the angled bezel in a fourth embodiment of the invention.
Figure 12:
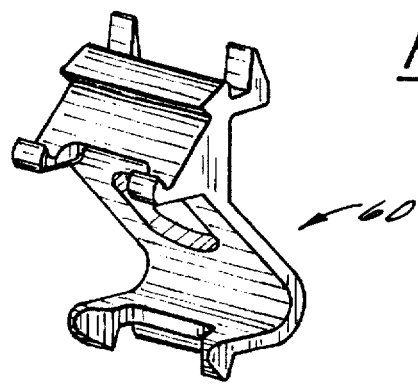
FIG. 12 is a perspective view of the angled bezel in a fourth embodiment of the invention.

FIGS. 10–12 are respective front, side and perspective views of an alternative angled bezel 60. The angled bezel 60 is similar to the angled bezel 50 in that there is only one opening 62 in the body 12. The opening 62 in angled bezel 60 receives a single ST-type connector to form a simplex ST-type port.

Figure 13:
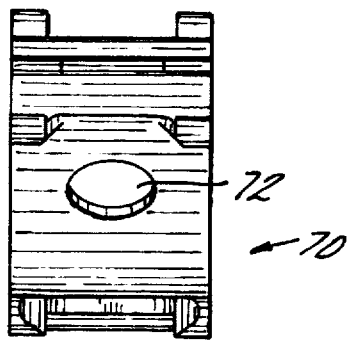
FIG. 13 is a front view of an angled bezel in a fifth embodiment of the invention.
Figure 14:
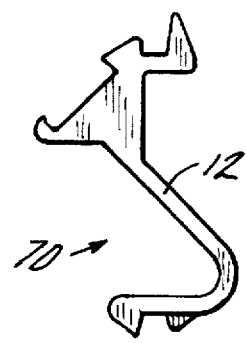
FIG. 14 is a side view of the angled bezel in a fifth embodiment of the invention.
Figure 15:
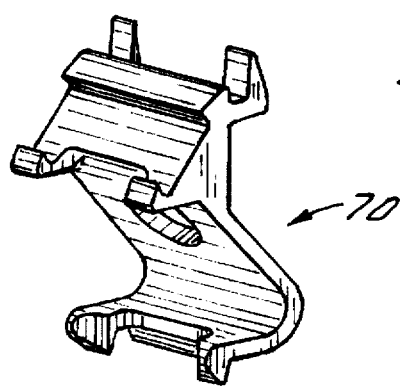
FIG. 15 is a perspective view of the angled bezel in a fifth embodiment of the invention.

FIGS. 13–15 are respective front, side and perspective views of an alternative angled bezel 70. The angled bezel 70 is similar to the angled bezel 60 in that there is only one opening 62 in the body 12. The opening 72 in angled bezel 70 receives a single RCA-type connector to form a simplex RCA-type port.

Figure 16:
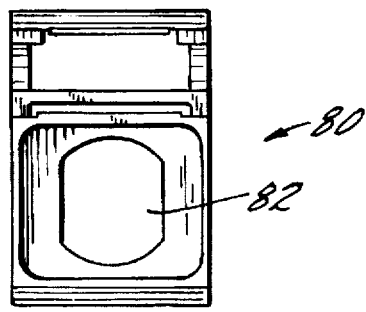
FIG. 16 is a front view of a flat bezel in a sixth embodiment of the invention.
Figure 17:
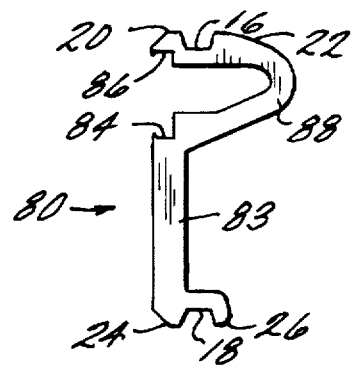
FIG. 17 is a side view of the flat bezel in a sixth embodiment of the invention.

FIG. 16 is a front view of a flat bezel 80. As shown in FIG. 17, the flat bezel 80 includes top notches 16 and bottom notches 18. The top notches 16 have curved surfaces 20 and 22 adjacent to the opening of each notch 16. The bottom notches 18 also have curved surfaces 24 and 26 adjacent to the opening of each notch 18. As previously described, the curved surfaces ease mounting the flat bezel in a panel cut-out from either side of the panel.

The body 83 of the flat bezel 80 is in a different orientation than the angled bezels shown in FIGS. 1–15. As previously described, the notches 16 and 18 define a plane corresponding to the plane of the cut-out in the panel. The body 83 is substantially parallel to this plane. A pair of icon holding grooves 84 and 86 are included in the flat bezel 80. The first icon holding groove 84 is formed on the body section 83. The second icon holding groove 86 is formed near the top notches 16 at one end of resilient section 88.

To mount the flat bezel 80 in the panel cut-out, a similar procedure is followed as described above. The bottom notches 18 are placed in the panel and engage the edge of the panel cut-out. The flat bezel 80 is then pressed towards the panel. The curved surfaces 20 or 22 contact the edge of the panel cut-out and flex the top notches 16 towards the body 83. Once the curved surface 20 or 22 clears the edge of the panel, the top notches 16 snap around the edge of the panel cut-out.

An important feature of the flat bezel 80 is that the icon serves as a lock to prevent the resilient section 88 from flexing. When an icon is placed in grooves 84 and 86, the top notches 16 are prevented from moving towards the body 83 due to the height of the icon. Until the icon is removed, the notches 16 and 18 cannot become disengaged from the edge of the panel cut-out. Thus, the flat bezel 80 is securely locked in place.

The body 83 includes an opening 82 for receiving a connector. In the flat bezel 80 shown in FIG. 16, the opening 82 receives a single ST-type fiber optic connector to provide a simplex ST-type port.

Figure 18:
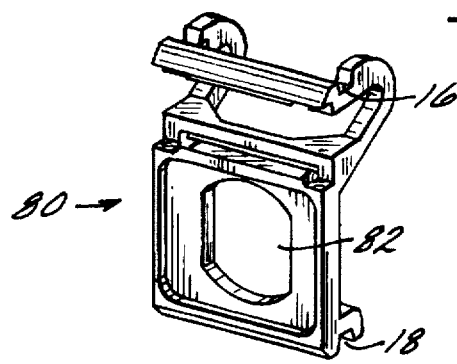
FIG. 18 is a perspective view of the flat bezel in a sixth embodiment of the invention.
Figure 19:
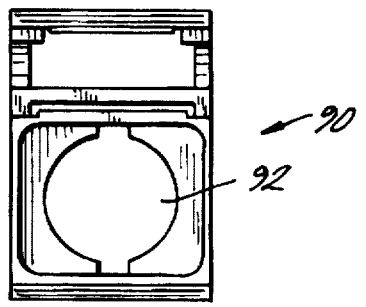
FIG. 19 is a front view of a flat bezel in a seventh embodiment of the invention.
Figure 20:
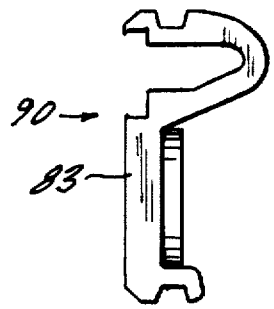
FIG. 20 is a side view of the flat bezel in a seventh embodiment of the invention.
Figure 21:
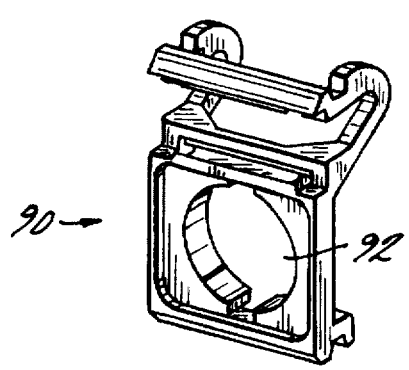
FIG. 21 is a perspective view of the flat bezel in a seventh embodiment of the invention.

FIGS. 19–21 are respective front, side and perspective views of an alternative flat bezel 90. The flat bezel 90 is similar to flat bezel 80 shown in FIGS. 16–18. Flat bezel 90 has an opening 92 formed in body 83 for receiving a single BNC-type coaxial connector to provide a simplex BNC-type port.

Figure 22:
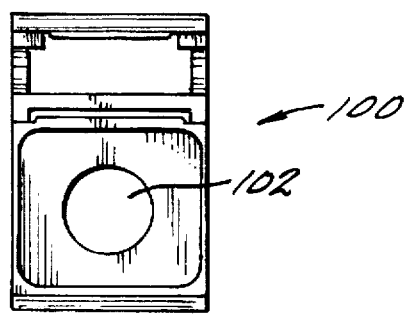
FIG. 22 is a front view of a flat bezel in a eighth embodiment of the invention.
Figure 23:
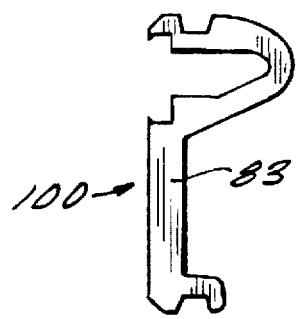
FIG. 23 is a side view of the flat bezel in a eighth embodiment of the invention.
Figure 24:
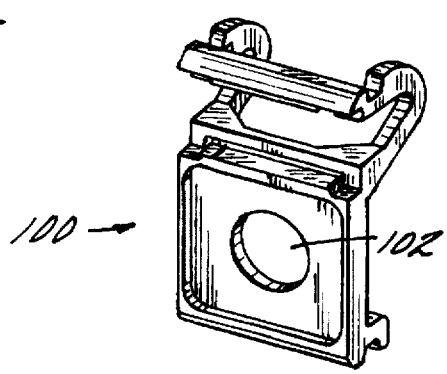
FIG. 24 is a perspective view of the flat bezel in a eighth embodiment of the invention.

FIGS. 22–24 are respective front, side and perspective views of an alternative flat bezel 100. The flat bezel 100 is similar to flat bezel 80 shown in FIGS. 16–18. Flat bezel 100 has an opening 102 formed in body 83 for receiving a single RCA-type coaxial connector to provide a simplex RCA-type port.

Figure 25:
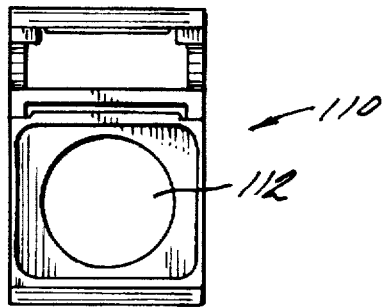
FIG. 25 is a front view of a flat bezel in a ninth embodiment of the invention.
Figure 26:
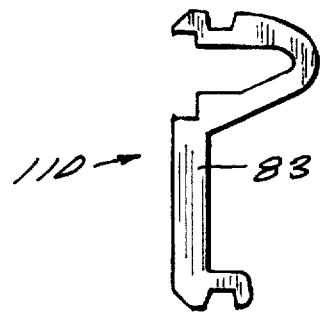
FIG. 26 is a side view of the flat bezel in a ninth embodiment of the invention.
Figure 27:
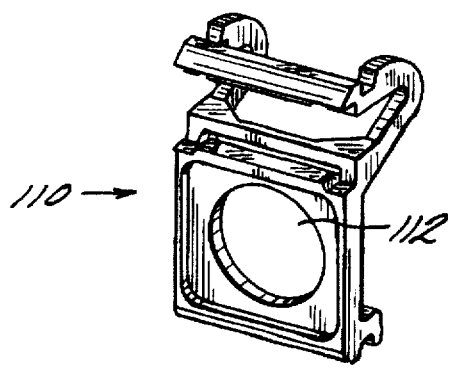
FIG. 27 is a perspective view of the flat bezel in a ninth embodiment of the invention.

FIGS. 25–27 are respective front, side and perspective views of an alternative flat bezel 110. The flat bezel 110 is similar to flat bezel 80 shown in FIGS. 16–18. Flat bezel 110 has an opening 112 formed in body 83 for receiving a single F-type coaxial connector to provide a simplex F-type port.

Figure 28:
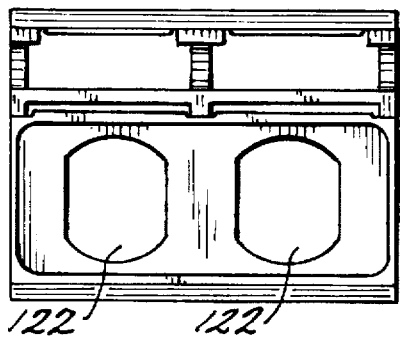
FIG. 28 is a front view of an flat bezel in a tenth embodiment of the invention.
Figure 29:
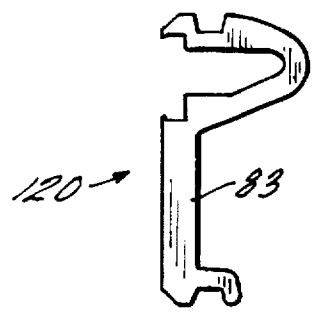
FIG. 29 is a side view of the flat bezel in a tenth embodiment of the invention.
Figure 30:
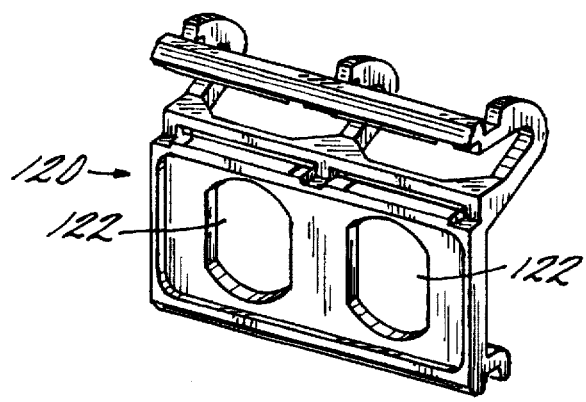
FIG. 30 is a perspective view of the flat bezel in a tenth embodiment of the invention.

FIGS. 28–30 are respective front, side and perspective views of an alternative flat bezel 120. The flat bezel 120 is similar to flat bezel 80 shown in FIGS. 16–18. However, the flat bezel 110 is approximately twice as wide as the flat bezel 80. This increase in width is to provide space for two openings 122 in body 83. In addition, the flat bezel 120 can receive two icons for identifying each port. Flat bezel 120 has openings 122 formed in body 83 for receiving two ST-type fiber optic connectors to provide a duplex ST-type port.

Figure 31:
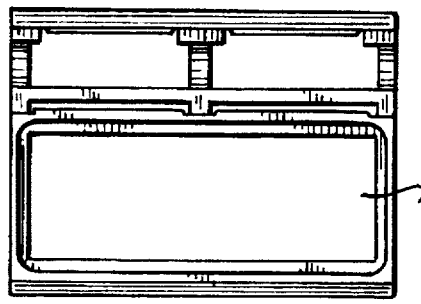
FIG. 31 is a front view of a flat bezel in an eleventh embodiment of the invention.
Figure 32:
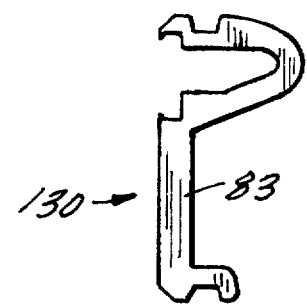
FIG. 32 is a side view of the flat bezel in an eleventh embodiment of the invention.
Figure 33:
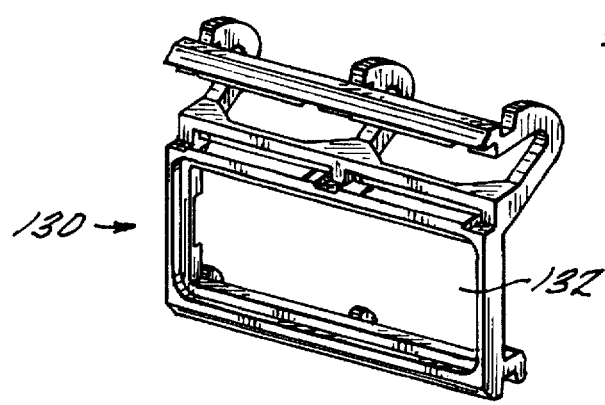
FIG. 33 is a perspective view of the flat bezel in an eleventh embodiment of the invention.

FIGS. 31–33 are respective front, side and perspective views of an alternative flat bezel 130. The flat bezel 130 is similar to flat bezel 120 shown in FIGS. 28–30. Flat bezel 130 has an opening 132 formed in body 83 for receiving a duplex SC-type fiber optic connector to provide a duplex SC-type port.

The multimedia bezels described above are all side stackable. The side surfaces of each of the bezels is planar and abuts flush against adjacent bezels in the panel cut-out leaving no gap between the respective bezels. This allows the configuration of bezels in a panel cut-out to be varied with ease. For example, a panel cut-out sized to receive two duplex bezels could also receive four simplex bezels with no gaps between the individual bezels or the panel cut-out edge and the bezels. Accordingly, the arrangement of bezels in the panel cut-out can be easily modified.

The multimedia bezels of the present invention provide a convenient mechanism for altering the connection type in a panel without the need to replace the existing panel. The bezels are sized to fit a standard panel cut-out making conversion from one connection type to another easy. The bezels have both angled and flat configurations and thus are suitable for a variety of cable routing applications.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A bezel for mounting a connector in a panel, said bezel comprising:

a body having an opening formed therein for receiving the connector;

at least one top notch for engaging a first edge of a cut-out in the panel; and at least one bottom notch for engaging a second edge of the cut-out;

wherein said top notch and said bottom notch define a plane and said body is at an oblique angle relative to said plane.

2. The bezel of claim 1 further comprising at least one curved surface adjacent to an opening of said top notch.

3. The bezel of claim 1 further comprising at least one curved surface adjacent to an opening of said bottom notch.

4. A bezel for mounting a connector in a panel, said bezel comprising:

a body having an opening formed therein for receiving the connector;

at least one top notch for engaging a first edge of a cut-out in the panel;

at least one bottom notch for engaging a second edge of the cut-out, and a first icon holding groove and a second icon holding groove for receiving an icon.

5. The bezel of claim 4 wherein said first icon holding groove is located on said body and said second icon holding groove is located at an end of said resilient section.

6. The bezel of claim 1 wherein said opening is sized to receive a duplex SC fiber optic connector.

7. The bezel of claim 1 wherein said opening is sized to receive a duplex ST fiber optic connector.

8. The bezel of claim 1 wherein said opening is sized to receive an F-type coaxial connector.

9. The bezel of claim 1 wherein said opening is sized to receive a single ST fiber optic connector.

10. The bezel of claim 1 wherein said opening is sized to receive a single RCA connector.

11. The bezel of claim 1 wherein said opening is sized to receive a single BNC connector.

12. The bezel of claim 1 wherein said bezel includes planar side surfaces.

13. A bezel for mounting a connector in a panel, said bezel comprising:

a body having an opening formed therein for receiving the connector;

at least one top notch for engaging a first edge of a cut-out in the panel;

at least one bottom notch for engaging a second edge of the cut-out; and a resilient section between said body and one of said top and bottom notches;

wherein said top notch and said bottom notch define a plane and said body is at an oblique angle relative to said plane.

* * * * *